US012632564B2

(12) United States Patent

Buddareddygari et al.

(10) Patent No.: US 12,632,564 B2

(45) Date of Patent: May 19, 2026

(54) TARGETED ATTACKS ON DEEP REINFORCEMENT LEARNING-BASED AUTONOMOUS DRIVING WITH LEARNED VISUAL PATTERNS

(71) Applicants: Prasanth Buddareddygari, Bothell, WA (US); Travis Zhang, Chandler, AZ (US); Yezhou Yang, Phoenix, AZ (US); Yi Ren, Chandler, AZ (US)

(72) Inventors: Prasanth Buddareddygari, Bothell, WA (US); Travis Zhang, Chandler, AZ (US); Yezhou Yang, Phoenix, AZ (US); Yi Ren, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 148 days.

(21) Appl. No.: 18/599,821

(22) Filed: Mar. 8, 2024

(65) Prior Publication Data

US 2024/0303349 A1 Sep. 12, 2024

Related U.S. Application Data

(60) Provisional application No. 63/450,902, filed on Mar. 8, 2023.

(51) Int. Cl.
G06F 21/57 (2013.01)
G06N 3/044 (2023.01)
(Continued)

(52) U.S. Cl.
CPC ........... G06F 21/577 (2013.01); G06N 3/044 (2023.01); G06N 3/08 (2013.01); G06N 20/00 (2019.01)

(58) Field of Classification Search
CPC ........ G06F 21/577; G06N 3/044; G06N 3/08; G06N 20/00
See application file for complete search history.

(56) References Cited

U.S. PATENT DOCUMENTS

| 2021/0397896 A1* | 12/2021 | Ardulov | ................. G06V 20/56 |
| 2022/0114805 A1* | 4/2022 | Jarquin Arroyo | ........ G06N 3/08 |

(Continued)

OTHER PUBLICATIONS

Akhtar et al., "Threat of Adversarial Attacks on Deep Learning in Computer Vision: A Survey", vol. 6, IEEE Access, Mar. 28, 2018, pp. 14410-14430.

(Continued)

*Primary Examiner* — Shirley X Zhang
(74) *Attorney, Agent, or Firm* — Shumaker & Sieffert, P.A.

(57) ABSTRACT

A system may be configured for implementing targeted attacks on deep reinforcement learning-based autonomous driving with learned visual patterns. In some examples, processing circuitry receives first input specifying an initial state for a driving environment and user configurable input specifying a target state. Processing circuitry may generate a representative dataset of the driving environment by performing multiple rollouts of the vehicle through the driving environment, including performing an action for the vehicle from the initial state with variable strength noise added to determine a next state for each rollout resulting from the action. Processing circuitry may train an artificial intelligence model to output a next predicted state based on the representative dataset as training input. In such an example, processing circuitry outputs from the artificial intelligence model, an attack plan against the autonomous driving agent to achieve the target state from the initial state.

19 Claims, 13 Drawing Sheets

(51) Int. Cl.
    *G06N 3/08* (2023.01)
    *G06N 20/00* (2019.01)

(56) References Cited

U.S. PATENT DOCUMENTS

2022/0126864 A1* 4/2022 Moustafa .......... B60W 60/0013
2023/0056233 A1* 2/2023 Cyr ..................... H04W 12/009
2025/0259535 A1* 8/2025 Lu .......................... G06V 20/54

OTHER PUBLICATIONS

Athalye et al., "Synthesizing Robust Adversarial Examples", Proceedings of the 35 th International Conference on Machine Learning, PMLR, Jul. 3, 2018, 10 pp.
Badia et al., "Agent57: Outperforming the Atari Human Benchmark", Proceedings of the 37 th International Conference on Machine Learning, PMLR, Nov. 21, 2020, 11 pp.
Behzadan et al., "Vulnerability of Deep Reinforcement Learning to Policy Induction Attacks", Machine Learning and Data Mining in Pattern Recognition: 13th International Conference, MLDM, Springer International Publishing, Jan. 16, 2017, 14 pp.
Boloor et al., "Attacking Vision-based Perception in End-to-End Autonomous Driving Models", Journal of Systems Architecture, vol. 110, Elsevier, Nov. 1, 2020, 14 pp.
Buddareddygari et al., "Targeted Attack on Deep RL-based Autonomous Driving with Learned Visual Patterns", 2022 International Conference on Robotics and Automation (ICRA), IEEE, Mar. 9, 2022, pp. 10571-10577.
Carlini et al., "Towards Evaluating the Robustness of Neural Networks", arXiv:1608.04644v2, 2017 IEEE symposium on security and privacy (sp), Mar. 22, 2017, 19 pp.
Duan et al., "Benchmarking deep reinforcement learning for continuous control", Proceedings of the 33 rd International Conference on Machine Learning, PMLR, Jun. 11, 2016, pp. 1329-1338.
Eykholt et al., "Robust Physical-World Attacks on Deep Learning Visual Classification", Proceedings of the IEEE conference on computer vision and pattern recognition, Jun. 2018, pp. 1625-1634.
Gleave et al., "Adversarial policies: Attacking deep reinforcement learning", arXiv preprint arXiv:1905.10615, Jan. 17, 2021, 16 pp.
Goodfellow et al., "Explaining and harnessing adversarial examples", arXiv:1412.6572v3, Mar. 20, 2015, 11 pp.
Gu et al., "Deep Reinforcement Learning for Robotic Manipulation with Asynchronous Off-Policy Updates", 2017 IEEE International Conference on Robotics and Automation (ICRA), IEEE Access, May 29, 2017, pp. 3389-3396.
Ha et al., "Recurrent World Models Facilitate Policy Evolution", 32nd Conference on Neural Information Processing Systems (NeurIPS 2018), 2018, 13 pp., (Applicant points out, in accordance with MPEP 609.04(a), that the year of publication, 2018, is sufficiently earlier than the effective U.S. filing date, so that the particular month of publication is not an issue.).
Huang et al., "Adversarial Attacks on Neural Network Policies", arXiv:1702.02284v1, Feb. 8, 2017, 10 pp.
Huang et al., "Adversarial Manipulation of Reinforcement Learning Policies in Autonomous Agents", 2018 International Joint Conference on Neural Networks (IJCNN), IEEE Access, Jul. 8, 2018, 8 pp.
Jia et al., "Adversarial Examples for Evaluating Reading Comprehension Systems", arXiv:1707.07328v1, Jul. 23, 2017, 11 pp.
Kingma et al., "Adam: A method for stochastic optimization", arXiv:1412.6980v9, ICLR, Jan. 30, 2017, 15 pp.
Klimov, "Carracing-v0", Waybackmachine, Apr. 26, 2017, 3 pp., URL: https://web.archive.org/web/20170426132715/gym.openai.com/envs/CarRacing-v0.
Kong et al., "PhysGAN: Generating Physical-World-Resilient Adversarial Examples for Autonomous Driving", Proceedings of the IEEE/CVF conference on computer vision and pattern recognition, IEEE, Jun. 2020, pp. 14254-14263.
Kos et al., "Delving into adversarial attacks on deep policies", arXiv:1705.06452v1, May 18, 2017, 6 pp.

Kurakin et al., "Adversarial examples in the physical world", arXiv:1607.02533v4, Feb. 11, 2017, 14 pp.
Laskin et al., "CURL: Contrastive Unsupervised Representations for Reinforcement Learning", Proceedings of the 37 th International Conference on Machine Learning, PMLR, Nov. 21, 2020, pp. 5639-5650.
Liang et al., "CIRL: Controllable Imitative Reinforcement Learning for Vision-based Self-driving", Proceedings of the European conference on computer vision (ECCV), Springer, 2018, 16 pp., (Applicant points out, in accordance with MPEP 609.04(a), that the year of publication, 2018, is sufficiently earlier than the effective U.S. filing date, so that the particular month of publication is not an issue.).
Lin et al., "Tactics of Adversarial Attack on Deep Reinforcement Learning Agents", arXiv:1703.06748v4, Nov. 13, 2019, 7 pp.
Mnih et al., "Asynchronous Methods for Deep Reinforcement Learning", Proceedings of the 33 rd International Conference on Machine Learning, vol. 48, PMLR, Jun. 11, 2016, 10 pp.
Mnih et al., "Human-level control through deep reinforcement learning", vol. 518, No. 7540, Macmillan Publishers Limited, Feb. 26, 2015, 13 pp.
Nguyen et al., "Deep Neural Networks are Easily Fooled: High Confidence Predictions for Unrecognizable Images", Proceedings of the IEEE conference on computer vision and pattern recognition, IEEE, Jun. 2015, pp. 427-436.
Pattanaik et al., "Robust Deep Reinforcement Learning with Adversarial Attacks", arXiv:1712.03632v1, Dec. 11, 2017, 15 pp.
Qin et al., "Imperceptible, Robust, and Targeted Adversarial Examples for Automatic Speech Recognition", Proceedings of the 36 th International Conference on Machine Learning, PLMR, May 24, 2019, 10 pp.
Riba et al., "Kornia: an Open Source Differentiable Computer Vision Library for PyTorch", Proceedings of the IEEE/CVF Winter Conference on Applications of Computer Vision, IEEE Access, 2020, pp. 3674-3683, (Applicant points out, in accordance with MPEP 609.04(a), that the year of publication, 2020, is sufficiently earlier than the effective U.S. filing date, so that the particular month of publication is not an issue.).
Schrittwieser et al., "Mastering Atari, Go, Chess and Shogi by Planning with a Learned Model", arXiv:1911.08265v2, vol. 588, No. 7839, Feb. 21, 2020, 21 pp.
Sharif et al., "Accessorize to a Crime: Real and Stealthy Attacks on State-of-the-Art Face Recognition", Proceedings of the 2016 acm sigsac conference on computer and communications security, Oct. 24, 2016, pp. 1528-1540.
Su et al., "One Pixel Attack for Fooling Deep Neural Networks", arXiv:1710.08864v7, vol. 23, No. 5, IEEE Transactions on Evolutionary Computation, Oct. 17, 2019, 15 pp.
Sun et al., "Stealthy and efficient adversarial attacks against deep reinforcement learning", Proceedings of the AAAI Conference on Artificial Intelligence, vol. 34, No. 4, Apr. 3, 2020, pp. 5883-5891.
Todorov et al., "MuJoCo: A physics engine for model-based control", 2012 IEEE/RSJ international conference on intelligent robots and systems, IEEE Access, Oct. 7, 2012, pp. 5026-5033.
Wang et al., "Deep reinforcement learning for autonomous driving", CMU 10703 Deep Reinforcement Learning and Control Course Project, May 19, 2019, 9 pp.
Weng et al., "Toward evaluating robustness of deep reinforcement learning with continuous control", International Conference on Learning Representations (ICLR), Dec. 19, 2019, 13 pp.
Yang et al., "Finding Adversarial Examples for Simulated Autonomous Driving with Fast and Differentiable Image Compositing", arXiv:2010.08844v2, Jun. 11, 2021, 15 pp.
Zhang et al., "Robust Deep Reinforcement Learning against Adversarial Perturbations on State Observations", 34th Conference on Neural Information Processing Systems, vol. 33, 2020, 14 pp., (Applicant points out, in accordance with MPEP 609.04(a), that the year of publication, 2020, is sufficiently earlier than the effective U.S. filing date, so that the particular month of publication is not an issue.).

* cited by examiner

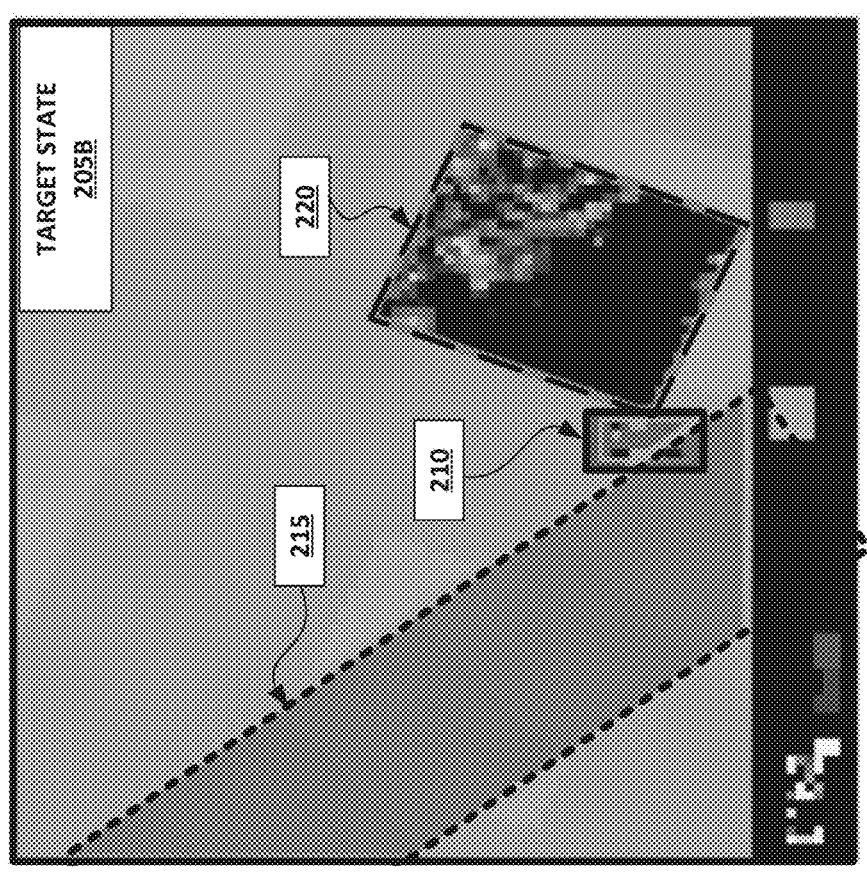
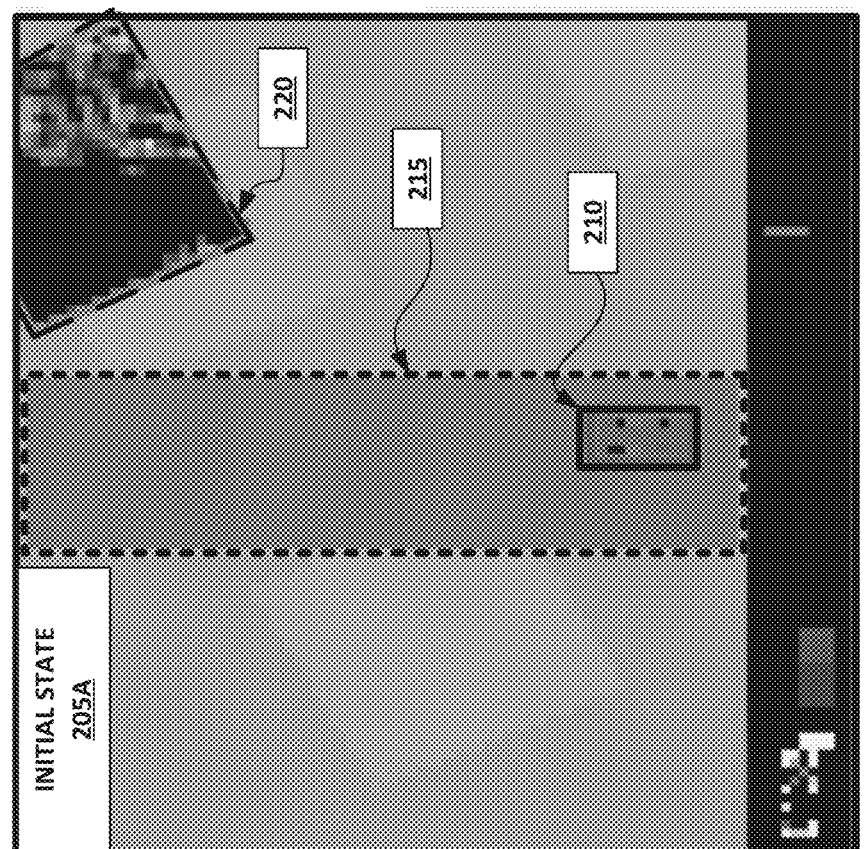
FIG. 2

Figure 4:
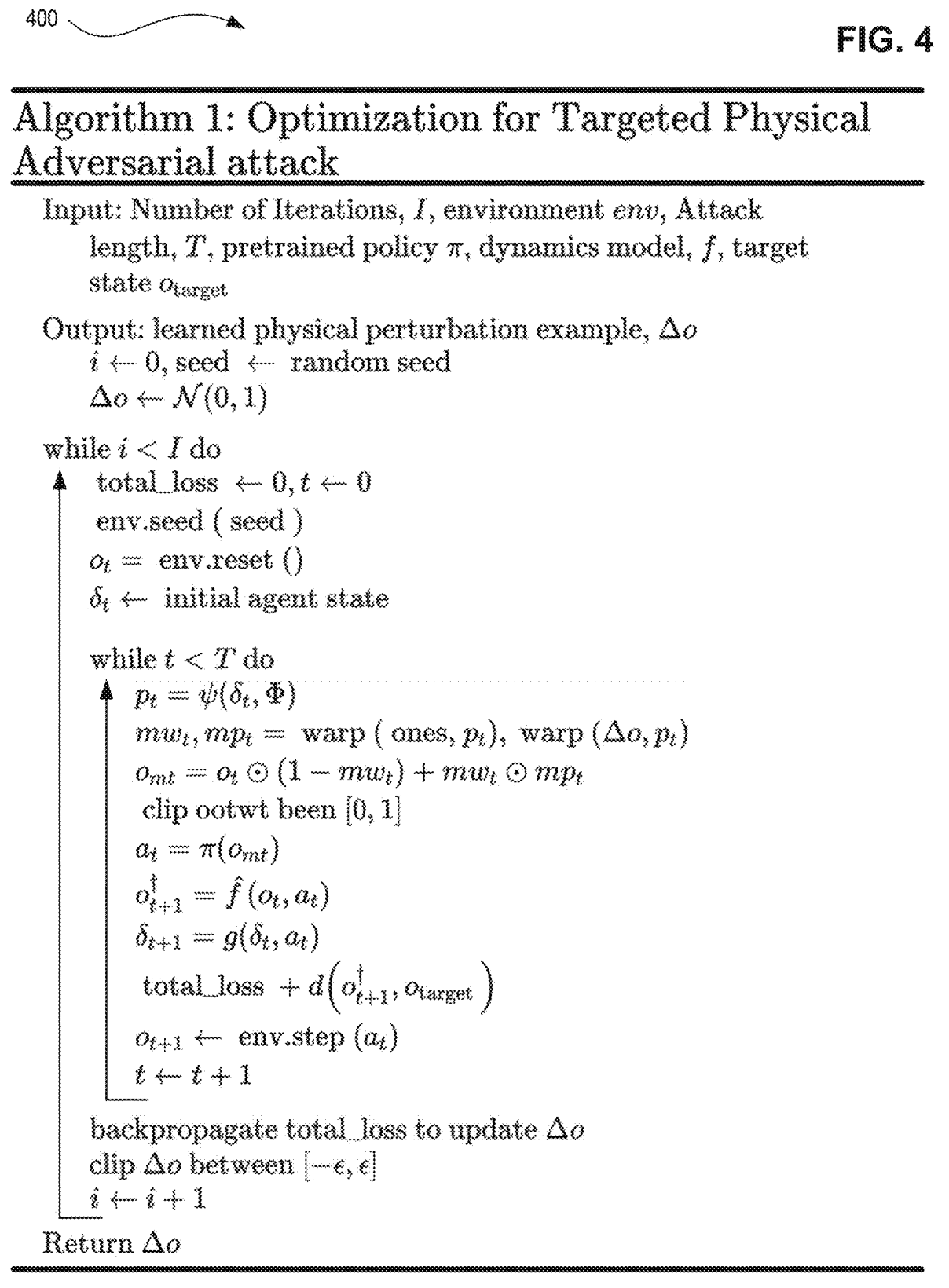

Algorithm 1: Optimization for Targeted Physical Adversarial attack

Input: Number of Iterations, $I$, environment $env$, Attack
    length, $T$, pretrained policy $\pi$, dynamics model, $f$, target
    state $o_{target}$ Output: learned physical perturbation example, $\Delta o$
    $i \leftarrow 0$, seed $\leftarrow$ random seed
    $\Delta o \leftarrow \mathcal{N}(0, 1)$ while $i < I$ do
    total_loss $\leftarrow 0, t \leftarrow 0$
    env.seed ( seed )
    $o_t =$ env.reset ()
    $\delta_t \leftarrow$ initial agent state while $t < T$ do
        $p_t = \psi(\delta_t, \Phi)$
        $mw_t, mp_t =$ warp ( ones, $p_t$), warp ($\Delta o, p_t$)
        $o_{mt} = o_t \odot (1 - mw_t) + mw_t \odot mp_t$
        clip ootwt been $[0, 1]$
        $a_t = \pi(o_{mt})$
        $o^{\dagger}_{t+1} = \hat{f}(o_t, a_t)$
        $\delta_{t+1} = g(\delta_t, a_t)$
        total_loss $+ d\left(o^{\dagger}_{t+1}, o_{target}\right)$
        $o_{t+1} \leftarrow$ env.step ($a_t$)
        $t \leftarrow t + 1$ backpropagate total_loss to update $\Delta o$
    clip $\Delta o$ between $[-\epsilon, \epsilon]$
    $i \leftarrow i + 1$ Return $\Delta o$ Table 2:

| SCENARIOS -750 | ACTIONS ERROR | CHANGE OF VALUE (%) |
|---|---|---|
| 751 - STRAIGHT + RANDOM | 0.064 | 0 |
| 752 - LEFT TURN + RANDOM | 0.069 | 0 |
| 753 - RIGHT TURN + RANDOM | 0.046 | -10.72 |
| 754 - STRAIGHT + PROPOSED | 0.126 | -17.70 |
| 755 - LEFT TURN + PROPOSED | 0.138 | -32.26 |
| 756 - RIGHT TURN + PROPOSED | 0.062 | -32.15 |

Table 3:

900

|  | Attack Length $T$ 910 | | | | | |
|  | $T = 15$ | | $T = 25$ | | $T = 30$ | |
| ADVERSARIAL BOUNDS $\epsilon$ 905 | ATTACK LOSS | ATTACK ERROR | ATTACK LOSS | ATTACK ERROR | ATTACK LOSS | ATTACK ERROR |
| 0.1 | 0.091 | 0.064 | 0.090 | 0.064 | 0.088 | 0.063 |
| 0.3 | 0.088 | 0.078 | 0.087 | 0.069 | 0.085 | 0.066 |
| 0.5 | 0.086 | 0.113 | 0.077 | 0.107 | 0.083 | 0.070 |
| 0.9 | 0.081 | 0.125 | 0.076 | 0.126 | 0.078 | 0.093 |

FIG. 9

TARGETED ATTACKS ON DEEP REINFORCEMENT LEARNING-BASED AUTONOMOUS DRIVING WITH LEARNED VISUAL PATTERNS

CLAIM OF PRIORITY

This application claims the benefit of U.S. Patent Application No. 63/450,902, filed 8 Mar. 2023, the entire contents of which is incorporated herein by reference.

GOVERNMENT RIGHTS AND GOVERNMENT AGENCY SUPPORT NOTICE

This invention was made with government support under 1925403, 2038666 and 2101052 awarded by the National Science Foundation. The government has certain rights in the invention.

TECHNICAL FIELD

Embodiments of the invention relate generally to the field of artificial intelligence (AI) using machine learning, and more particularly, to systems, methods, and apparatuses for implementing targeted attacks on deep reinforcement learning-based autonomous driving with learned visual patterns.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality.

Contrasted from supervised learning, reinforcement learning (RL) enables machine learning using unlabeled input/output pairs without the requirement to explicitly correct sub-optimal actions. Instead, reinforcement learning may focus on finding a balance between exploration of uncharted territory and exploitation of current knowledge.

The present state of the art may therefore benefit from the systems, methods, and apparatuses for implementing targeted attacks on deep reinforcement learning-based autonomous driving with learned visual patterns, as is described herein.

SUMMARY

In general, this disclosure is directed to systems, methods, and apparatuses for implementing targeted attacks on deep reinforcement learning-based autonomous driving with learned visual patterns.

Recent studies have demonstrated the vulnerability of control policies learned through deep reinforcement learning against adversarial attacks, raising concerns about the application of such models to risk-sensitive tasks such as autonomous driving. Threat models for these demonstrations have been limited to (1) targeted attacks through real-time manipulation of the agent's observation, and (2) untargeted attacks through manipulation of the physical environment. The former assumes full access to the agent's states/observations at all times, while the latter has no control over attack outcomes. The feasibility of targeted attacks are therefore evaluated through visually learned patterns placed on physical objects in the environment, using a threat model specially configured to benefit from both the practicality and effectiveness of existing models, while extending beyond the capability of such models through the techniques set forth herein.

Through analysis, it has been demonstrated that a pre-trained policy can be hijacked within a time window, e.g., performing an unintended self-parking, when an adversarial object is present. To enable the attack, an assumption is adopted that the dynamics of both the environment and the agent can be learned by the attacker. Lastly, the effectiveness of the proposed attack is empirically shown for different driving scenarios, through the performance of a location robustness test, and a study of the tradeoff between the attack strength and its effectiveness.

In at least one example, processing circuitry is configured to perform a method including: receiving a first input specifying an initial state for a driving environment having at least a roadway, a vehicle, and at least one obstacle positioned within the driving environment and receiving, from a user device, user configurable input specifying a target state for the driving environment; responsive to receiving the user configurable input specifying the target state for the driving environment, generating a representative dataset of the driving environment by performing multiple rollouts of the vehicle through the driving environment. According to such a method, performing each of the multiple rollouts of the vehicle through the driving environment includes: performing an action for the vehicle from the initial state using a pre-trained policy of an autonomous driving agent with variable strength noise added to the action to determine a next state resulting from the action on the initial state and updating the representative dataset with a rollout result tuple captured for each of the multiple rollouts performed specifying. (i) the initial state, (ii) the action including the variable strength noise added to the action, and (iii) the next state resulting from the action on the initial state. In at least one example of the method, processing circuitry trains an artificial intelligence model to output a next predicted state of the vehicle within the driving environment for a new action by providing as training input to the artificial intelligence model, the representative dataset including the rollout result tuple captured for each of the multiple rollouts performed and outputs, from the artificial intelligence model, an attack plan against the autonomous driving agent to achieve the target state from the initial state.

In at least one example, a system includes processing circuitry; non-transitory computer readable media; and instructions that, when executed by the processing circuitry, configure the processing circuitry to perform operations. In such an example, processing circuitry may configure the system to: receive a first input specifying an initial state for a driving environment having at least a roadway, a vehicle, and at least one obstacle positioned within the driving environment and receive, from a user device, user configurable input specifying a target state for the driving environment. Such a system may, responsive to receipt of the user configurable input specifying the target state for the driving environment, generate a representative dataset of the driving environment by performance of multiple rollouts of the vehicle through the driving environment. According to such an example, the instructions configure the processing circuitry of the system to perform each of the multiple rollouts of the vehicle through the driving environment by: performance of an action for the vehicle from the initial state using a pre-trained policy of an autonomous driving agent with variable strength noise added to the action to determine a next state resulting from the action on the initial state and an update to the representative dataset with a rollout result tuple captured for each of the multiple rollouts performed that specifies: (i) the initial state, (ii) the action including the variable strength noise added to the action, and (iii) the next state which results from the action on the initial state. According to such an example of the system, processing circuitry is configured to train an artificial intelligence model to output a next predicted state of the vehicle within the driving environment for a new action by providing as training input to the artificial intelligence model, the representative dataset including the rollout result tuple captured for each of the multiple rollouts performed and output, from the artificial intelligence model, an attack plan against the autonomous driving agent to achieve the target state from the initial state.

In one example, there is computer-readable storage media having instructions that, when executed, configure processing circuitry to: receive a first input specifying an initial state for a driving environment having at least a roadway, a vehicle, and at least one obstacle positioned within the driving environment and receive, from a user device, user configurable input specifying a target state for the driving environment. The computer-readable storage media may, responsive to receipt of the user configurable input specifying the target state for the driving environment, configure the processing circuitry to generate a representative dataset of the driving environment by performance of multiple rollouts of the vehicle through the driving environment. According to such an example, the instructions of the computer-readable storage media configure the processing circuitry of the system to perform each of the multiple rollouts of the vehicle through the driving environment by: performance of an action for the vehicle from the initial state using a pre-trained policy of an autonomous driving agent with variable strength noise added to the action to determine a next state resulting from the action on the initial state and an update to the representative dataset with a rollout result tuple captured for each of the multiple rollouts performed that specifies: (i) the initial state, (ii) the action including the variable strength noise added to the action, and (iii) the next state which results from the action on the initial state. According to such an example, processing circuitry is configured by the instructions of the computer-readable storage media to train an artificial intelligence model to output a next predicted state of the vehicle within the driving environment for a new action by providing as training input to the artificial intelligence model, the representative dataset including the rollout result tuple captured for each of the multiple rollouts performed and output, from the artificial intelligence model, an attack plan against the autonomous driving agent to achieve the target state from the initial state.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 2 depicts a targeted adversarial attack on an autonomous driving agent using an object fixed to the ground, in accordance with aspects of this disclosure.

FIG. 4 sets forth Algorithm 1 at element 400, providing an optimization for a targeted physical adversarial attack, in accordance with aspects of this disclosure.

FIG. 7 sets forth Table 2 at element 700, providing a comparison with random noise baseline in terms of evaluation metrics, in accordance with aspects of this disclosure.

FIG. 9 sets forth Table 3 at element 900, depicting adversarial bounds 905 versus attack length 910, in accordance with aspects of this disclosure.

Like reference characters denote like elements throughout the text and figures.

DETAILED DESCRIPTION

Described herein are systems, methods, and apparatuses for implementing targeted attacks on deep reinforcement learning-based autonomous driving with learned visual patterns.

Aspects of the disclosure provide improved methodologies to address the challenge of providing an explainable and auditable assessment of threats to autonomous driving agents. Utilizing white-box machine learning policies emphasizing transparency and explainability within an AI model, visually learned patterns of an effective adversarial threat model trained utilizing physical objects placed into a test environment may be better understood. Improved understanding regarding the adversarial threat model thus enables improved counter-measures and increased robustness of autonomous driving agents against future attacks.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically. CNNs take advantage of the hierarchical pattern in data and assemble more complex patterns using smaller and simpler patterns. Consequently, on the scale of connectedness and complexity, CNNs are on the lower extreme.

Also used within the context of machine learning is reinforcement learning or "RL" type learning. Reinforcement learning is an area of machine learning concerned with how intelligent agents ought to take actions in an environment in order to maximize the notion of cumulative reward. Reinforcement learning is one of three basic machine learning paradigms, alongside supervised learning and unsupervised learning.

Reinforcement learning differs from supervised learning in not needing labeled input/output pairs to be presented, and in not needing sub-optimal actions to be explicitly corrected. Instead, the focus is on finding a balance between exploration of uncharted territory and exploitation of current knowledge.

The environment is typically stated in the form of a Markov decision process (MDP) because many reinforcement learning algorithms for this context use dynamic programming techniques. A difference between the classical dynamic programming methods and reinforcement learning algorithms is that the latter do not assume knowledge of an exact mathematical model of the MDP and they target large MDPs where exact methods become infeasible.

Figure 1:
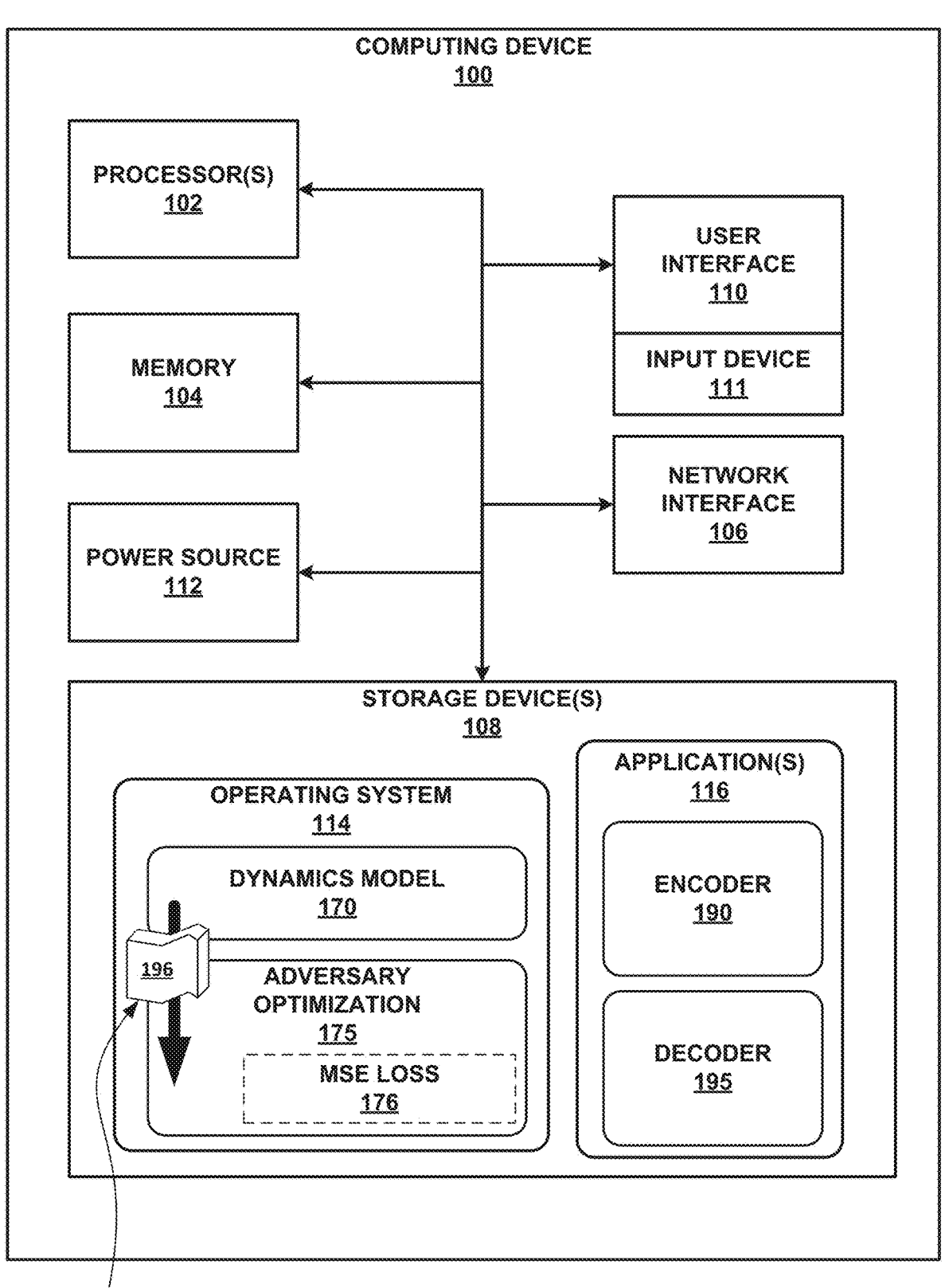
FIG. 1 is a block diagram illustrating further details of one example of computing device, in accordance with aspects of this disclosure.

FIG. 1 is a block diagram illustrating further details of one example of computing device, in accordance with aspects of this disclosure. FIG. 1 illustrates only one particular example of computing device 100. Many other example embodiments of computing device 100 may be used in other instances.

As shown in the specific example of FIG. 1, computing device 100 may include one or more processors 105, memory 104, a network interface 106, one or more storage devices 108, user interface 110, and power source 112. Computing device 100 may also include an operating system 114. Computing device 100, in one example, may further include one or more applications 116, such as encoder 190 and decoder 195. For instance, encoder 190 and decoder 195 may operate as part of a Convolutional Neural Network (CNN, or ConvNet).

Operating system 114 may execute various functions including creation of dynamics model 170 which operates on environmental conditions to determine a next state $o_{t+1}$ (e.g., future state) assuming a particular action $a_t$ is taken. Operating system 114 further includes adversary optimization 175 which may determine a physical adversarial attack which satisfies a reduced or minimized loss between prediction 196 from dynamics model 170 and a predefined target observation to generate as output, Mean Square Error loss (MSE loss) 176. MSE loss 176 may generate output from a loss function that quantifies the magnitude of the error between prediction 196 generated by dynamics model 170 via a machine learning algorithm and an actual output observed within an operational environment by taking the average of the squared difference between the predictions and the target values.

One or more other applications 116 may also be executable by computing device 100. Components of computing device 100 may be interconnected (physically, communicatively, and/or operatively) for inter-component communications.

In some examples, processing circuitry including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that can send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

Computing device 100 may also include user interface 110. User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that can generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

FIG. 2 depicts a targeted adversarial attack on an autonomous driving agent using an object fixed to the ground, in accordance with aspects of this disclosure.

The attack formulation incorporates the dynamics of the object subject to a pre-trained policy of the agent and the object itself. Depicted on the left side is initial state 205A and depicted on the right side is target state 205B achieved. Bounding boxes 210 indicates the cars or vehicles. Bounding boxes 215 indicates the road tracks. Bounding boxes 220 indicate the learned adversarial visual patterns.

Deep reinforcement learning (RL) has improved to the point where it produces close-to-human control policies on various tasks, including solving Atari games, robot manipulation, autonomous driving, and others.

However, Deep Neural Networks (DNNs) are vulnerable to adversarial attacks, with demonstrations in real world applications such as computer vision, natural language processing, and speech. Adversarial attacks are malicious attempts to manipulate AI systems by creating inputs that produce incorrect outputs. These attacks are often made in the form of purposely designed "noise," which can cause misclassification in a machine learning pipeline. Recent studies show that deep reinforcement learning agents may also be susceptible to such attacks due to their adoption of DNNs for value or policy approximation.

The threat models in the deep reinforcement learning domain form two categories: A first category assumes that an attacker can directly manipulate the states and observations of the agent or the actions of the agent. A second category of the thread models perform attacks utilizing physical objects placed in the environment. Among the first category, techniques include directly perturbing the observations of an agent at all time steps during a roll-out. Other similar techniques among the first category may attack during a chosen subset of time steps. Applications of these types of attacks to autonomous driving have been shown to be effective.

For instance, such techniques have demonstrated that learning the dynamics of agents and environments improves the efficacy of the attack in comparison to model-free methods. This first category of threats, however, is not practical as such attacks require direct access to the perception modules utilized by such agents to modify the observations. Such a strong prerequisite condition to launch attacks significantly limits the power of these threats.

A more feasible approach includes techniques utilizing attacks in which adversarial objects are placed in the environments to fool DNNs. Such attacks have been tested and proven effective in general applications such as image classification and face recognition. Specific to deep reinforcement learning, still other techniques have demonstrated the existence of physical adversaries, in the form of advertising sign boards and patterns painted on the road respectively, that successfully mislead autonomous driving systems. While such models are more practical, most of the existing attempts of this type are not targeted towards reaching a certain goal state. Instead, they seek to maximize the deviation of actions in the presence of adversaries from the benign policy. These loose-end attacks are generally considered effective only when the final state turns out to be disastrous. This is not guaranteed and thus the attack results vary.

Launching targeted attacks without direct access to the perception modules utilized by the agents remains an open challenge. To achieve this, it is assumed that the attacker can learn differentiable dynamical models that predict the transition of the environment and has access to the dynamics of the states of the agent with respect to actions taken by such agents. In support of such an approach, it is argued that these assumptions are reasonable since the environment (e.g., a particular road segment of the highway) is accessible to all, including the attacker, and agent dynamics (e.g., for vehicles) is common knowledge. Lastly, due to the focus on the existence of policy vulnerability, it is further assumed that the agent's policy model is white-box. White-box machine learning policies may emphasize transparency and explainability within an AI model. White-box models provide insights into the decision-making process, making them interpretable and auditable.

In such a way, the techniques and methodologies which are described in greater detail below, are the first to investigate the existence of targeted attacks on deep reinforcement learning models using adversarial objects in the environment. Specifically, the existence of static and structured perturbations on the environment are examined, so that within a time window, the agent is led to a state that is specified by the attacker, such as that which is depicted by target state 205B in an agent for vehicle 210 has been fooled into pursuing a actions which result in a vehicle represented within bounding box 210 leaving a road track as indicated by bounding box 215 in target state 205B.

Real world threat models are exposed: Through the practice of such techniques, it is thus possible to expose real-world threat models. For instance, a hacker could place an adversarial billboard sign next to the road to cause self-driving cars to veer off the track without directly modifying the observations made by an agent of the car.

Thus, the following technical contributions include at least the following improvements: (1) Firstly, the disclosed attack algorithm generates a static perturbation that may be directly realized through an object placed in the environment to mislead the agent towards a pre-specified state within a time window. (2) Secondly, ablation studies performed using the disclosed techniques show that the choices of the time window and the attack target are correlated. Therefore, fine-tuning of the loss function of the attack with respect to the time window may be performed to facilitate identifying successful attacks. (3) Third, the robustness of the derived attacks are evaluated with respect to their relative locations to the agent, with results showing that moving the attack object partially out of the sight of the agent will reduce the effect of the attack.

Figure 3A:
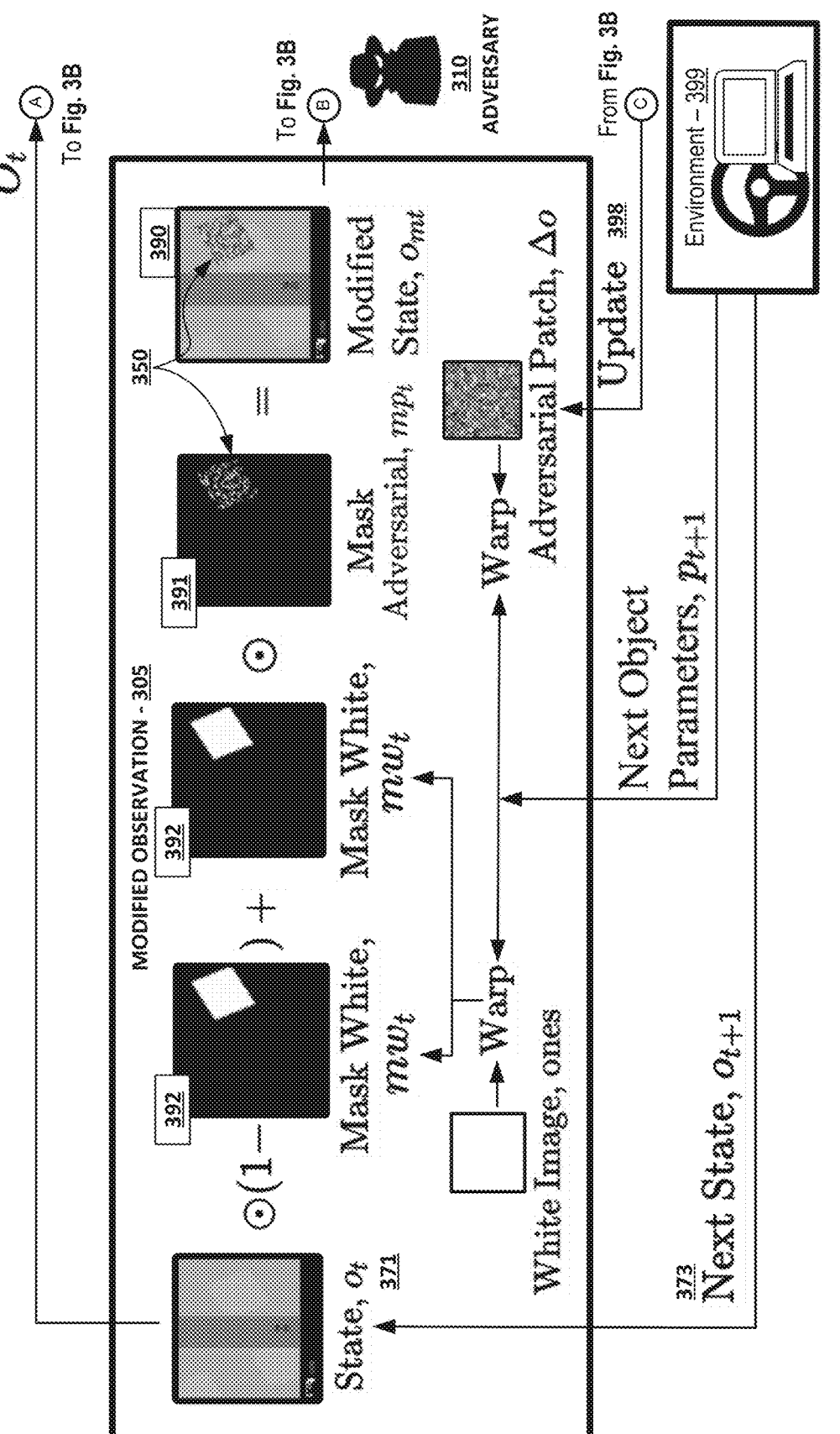
FIGS. 3A and 3B illustrate a physical adversarial attack using the OpenAI Gym's CarRacing-v0 environment for OpenAI Gym, in accordance with aspects of this disclosure.
Figure 3B:
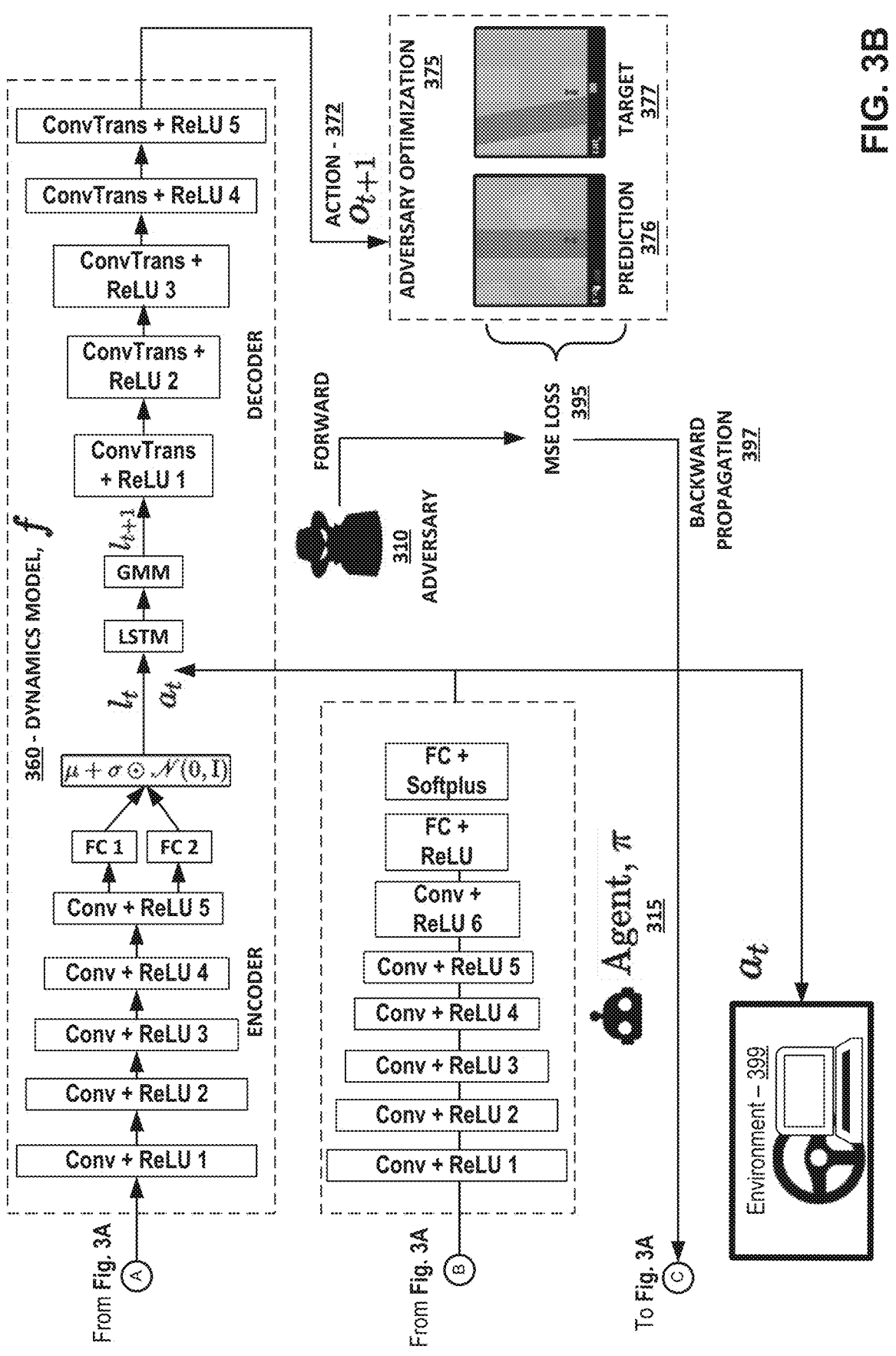

FIGS. 3A and 3B illustrate a physical adversarial attack using the Open AI Gym's CarRacing-v0 environment for OpenAI Gym, in accordance with aspects of this disclosure. FIG. 3A depicts modified observation 305 showing the creation of a modified observation 305 by an adversary 310 utilizing the planting of physical object 350 and updating physical object 350 within environment 399. FIG. 3B shows the creation of new dynamics model 360. For instance, adversary 310 may create a new dynamics model 360 and it is assumed that a policy for pre-trained agent 315 is known due to the availability of such information. Adversary optimization 375 shows the optimization performed by adversary 310 to perform a physical adversarial attack by minimizing the MSE loss 395 between prediction 376 from dynamics model 360 and the predefined target 377 observation.

Adversarial attacks on deep reinforcement learning (RL) agents: Adversarial attacks in reinforcement learning, especially in the deep reinforcement learning domain, have gained attention recently. For instance, adversarial attacks using reinforcement learning have experienced increased interest specifically in the context of Deep Neural Networks (DNNs).

In the Atari environment, techniques have utilized a strategically timed attack which focuses on finding the right time when an adversarial attack needs to be performed, and an enchanting attack, a targeted attack that generates adversarial examples in order to find actions that lead to a target state. Other techniques generate value function-based adversarial examples and yet others have utilized adversarial attacks on Deep Q Networks (DQNs) along with transferability to different DQN models. Still other techniques have utilized a gradient-based attack on Double Deep Q Networks (DDQNs) and Deep Deterministic Policy Gradient (DDPG), and developed a robust control framework through adversarial training. Yet another technique utilizes model-based adversarial attacks on MuJoCo domains using a target state as the attack goal similar to the enchanting attack. More recently, a state-adversarial Markov decision process has been utilized to evaluate adversarial attacks on model-free deep reinforcement learning algorithms.

While all these aforementioned approaches have shown that deep reinforcement learning systems are vulnerable to adversarial attacks, few have explored a target-controlled attack using a dynamical model in the manner described herein.

FIG. 4 sets forth Algorithm 1 at element 400, providing an optimization for a targeted physical adversarial attack, in accordance with aspects of this disclosure.

Physical Adversarial Attacks: Certain recent approaches have focused on physical adversarial attacks. With respect to multi-agent environments, certain techniques primarily focused on training an adversarial agent to exploit the weaknesses of traditionally-trained deep reinforcement learning agents. However, such an approach, being in a multi-agent setting, simply does not allow for physical objects to be placed in the environment and is different from the threat model set forth herein. Other approaches utilized a generative model that takes a 3D video slice as input and generates a single physical adversarial example. More recently, certain methods optimize physical perturbations on a set of frame sequences and place them directly on the environment using a differentiable mapping of the perturbations in 2D space to the 3D space. However, such techniques do not consider any target state for the agent to reach in the presence of physical adversarial examples. Still further, other techniques have demonstrated a targeted attack on autonomous driving systems, called a hijacking attack, where the agent takes a targeted path of actions pre-specified by the attacker. However, the techniques described herein differ from such approaches by permitting the attacker to choose a final target state (e.g., target state 205B of FIG. 2) and then applying Algorithm 1 (element 400) as the attack algorithm to internally learn the path of actions to reach the target. As shown here, the attack algorithm accepts an input and generates an output for return. Accepted as an input are a Number of Iterations, I, environment env, Attack length, T, pretrained policy $\pi$, dynamics model, f, target state $O_{target}$. Generated as output are the learned physical perturbation example, $\Delta o$, $i \leftarrow 0$, seed $\leftarrow$ random seed, and $\Delta o \leftarrow N (0,1)$. The compound while loops are then performed resulting in backpropagation of total loss to update $\Delta o$, clipping $\Delta o$ between $[-\epsilon, \epsilon]$, and incrementing $i \leftarrow i+1$. The attack algorithm then returns $\Delta o$.

Targeted Attack Via Learned Visual Patterns of Physical Objects

The disclosed task is formulated as attacking a deep reinforcement learning system with the adversarial object to be continuously effective at misguiding the agent, while the agent is moving in the environment due to the dynamics of the agent. This is a key difference which distinguishes the disclosed methodology from prior known deep reinforcement learning attacks provided by others in the technical space. The ability of the attacker to be continuously effective at misguiding the agent increases the likelihood of an effective attack, and potentially guarantees an effective attack through non-trivial manipulation of the agent. Moreover, unlike perturbations in the state or actions spaces in existing attacks, examples of the disclosed methodology perturb a static rectangular area which is fixed to the environment.

Notations and Preliminaries:

Introduced via this section are, the notation, problem statement, and technical details in support of a solution.

Let $o_t \in [0,1]^{w \times h \times c}$ be a gray-scale image with width w, height h, and channel size c, that represents the state (scenes) of an underlying Markov decision process (MDP). In the experiment, $o_t$ is the stack of the last four top-down views of a driving scene, resembling a simplification of data obtained through LIDAR. The term $o_t$ is used as the most recent image of the stack and the term $a_t \in [0,1]^n$ is the action vector chosen by the agent at time t, and n is the number of continuous actions to be determined. In the experiment, the actions include the normalized braking and acceleration rates and the change of steering angle.

Let $\pi: [0,1]^{w \times h \times c} \to [0,1]^n$ be a deterministic policy learned on the MDP with c equaling 1 to represent grayscale images.

Let equation 1 be the dynamics model of the environment that gives the next state $o_{t+1}$ when action $a_t$ is taken. Note that the agent, as a dynamical system, has its own state defined by normalized $\delta_t \in [0,1]^k$, where k is the number of properties. Equation 1 is set forth as follows:

$$f: [0, 1]^{w \times h \times c} \times [0, 1]^n \to [0, 1]^{w \times h \times c}.$$

In the experiment, $\delta_t$ is represented by the position, velocity, and steering angle of the vehicle. Dynamics of the agent are denoted according to equation 2, set forth as follows:

$$g: [0, 1]^k \times [0, 1]^n \to [0, 1]^k.$$

Attacks in the form of a gray-scale image (perturbation) are considered in a fixed rectangular area of the environment, such as those depicted at FIG. 2, initial state 205A and target state 205B. This image, without transformation, is denoted by $\Delta o$, and its global coordinates by $\Phi$. To integrate this image into the scene ($o_t$), the following differentiable procedure was programmed:

(1) The relative position of the adversarial rectangle in the scene, denoted by $p_t$, is first calculated based on the agent dynamics, g, the object's global coordinates, $\Phi$, and a transformation function, $\psi$ as $p_t = (\delta_t, \Phi)$, where $\delta_t = g(\delta_{t-1}, a_{t-1})$.

(2) Let ones be a matrix of ones. A mask $mw_t \in \{0,1\}^{w \times h}$ is created based on $p_t$ and ones using homography estimation, realized through a warp function. The term $mw_t$ only has 1s within the rectangle. Homography estimation is a fundamental problem in computer vision that involves finding the transformation between two images of the same scene taken from different viewpoints, analogous to what a human brain automatically does to reconstruct a 3D scene when it sees the same 3D scene from two different viewpoints.

(3) A transformed adversarial image $mp_t \in [0,1]^{w \times h}$ is created based on $p_t$ and $\Delta o$, again using homography estimation.

(4) Lastly, the adversarial image is integrated into the view, according to equation 3, set forth as follows:

$$o_{mt} = o_t \odot (1 - mw_t) + mw_t \odot mp_t,$$

where $\odot$ is the element-wise product.

The homography estimation and warping procedures described above overlap and extend beyond prior methodologies and are unique due to the differentiable layer implementation which allows for solving through gradient-based methods rather than the local linearization approach as was used by others.

Problem Statement

Given the initial state $O_0$ (which contains duplicates of the initial scene), the initial agent state $\delta_0$, the pretrained policy $\pi$, the dynamical models $f(\cdot, \cdot)$ and $g(\cdot, \cdot)$, and the transformation function, $\psi(\delta, \Phi)$, the methodology searches for an image $\Delta o$, with $\|\Delta o\|_\infty \le \epsilon$, that leads the agent to a specific target $O_{target}$ within the time window [0, T], according to Equation 4 which is set forth below, as follows:

Formally:

$$\min_{\|\Delta\|_\infty \le \epsilon} \sum_{t=1}^{T} \|o_t - o_{target}\|_2^2.$$

$$\text{s.t. } a_t = \pi(o_{mt}),$$

$$o_{mt} = o_t \odot (1 - mw_t) + mw_t \odot mp_t$$

$$mw_t = \text{warp (ones, } p_t), mp_t = \text{warp } (\Delta o, p_t),$$

$$p_t = \psi(\delta_t, \Phi), o_{t+1} = f(o_t, a_t), \delta_{t+1} = g(\delta_t, a_t).$$

Referring again to FIGS. 3A-3B, the dependency of variables involved in the problem addressed by Equation 4 are visualized. The loss function of Equation 4 accepts early convergence of the state of agent 315 to target 377. Scenes may be utilized without the adversarial perturbation in evaluating the MSE loss 395, since target 377 state is specified before the attack problem is solved. The use of dynamics model 360 learned by adversary 310, dynamics of agent 315, and a differentiable implementation of warp together make this problem differentiable with respect to the perturbation $\Delta o$, allowing the problem to be solved using gradient-based methods.

Learning dynamics of the environment: Introduced in this section is the procedure for learning a differentiable dynamical model of the environment, which is an essential step to enable a gradient-based attack. It is believed that the addition of this dynamical model explicitly accounts for state evolution in the attack generation and also the plan of actions leading to the target state. This makes the disclosed targeted attack more feasible and easier by letting the attacker specify a target state rather than how to reach that target state.

1) Data collection: Data is first collected in the format of state 371, action 372, and next state 373, produced utilizing multiple rollouts of the environment. Note that a successfully attacked rollout will encounter states different from those experienced through the benign policy. e.g., agent moving out of the highway. To collect a representative dataset, rollouts are performed using the pre-trained policy with noise of variable strength $\tau$ added to the actions, i.e, $a_t = a_t + N (0,1)*\tau$. The noisy actions help explore the environment, allowing the adversary to predict the environment dynamics correctly when approaching target 377. The resultant dataset is denoted by $$\mathcal{D} = \{(o_i, a_i, o_{i+1})\}_{i=1}^{N}.$$

Note that such data collection is achievable when launching a real-world attack, as long as the attacker adversary 310 can sample the state transitions towards the specified target 377 by using a vehicle with dynamics similar to the attacked agent 315.

2) Learning the environment dynamics: Since the environment state contains rich information (e.g., time-variant track and surroundings), feed forward neural networks fail to generalize well on the dataset. A technique is utilized by which to construct a dynamical model using a variational autoencoder (VAE) and a mixture-density recurrent neural network (MD-RNN), denoted by $\hat{f}(\cdot, \cdot; w)$, which takes in the environment state and action, and predicts the next environment state. The term w represents trainable parameters. The same combination of mean square error and a Kullback-Leibler divergence function is then used as the loss for training the VAE, and the Gaussian mixture loss for training the MD-RNN.

Optimization details: Algorithm 1 depicted by element 400 of FIG. 4 is used to solve the attack problem represented by Equation 4. During each iteration, modified state 390 containing the adversarial image $O_{mt}$ is obtained, as described in Equation 4 by computing adversarial mask 391 $mp_t$ and mask white 392 $mw_t$. To respect the observation limits seen by the agent 315, $O_{mt}$ is clipped between 0 and 1 so that a valid image is yielded. Agent 315 then performs an action 372 on $O_{mt}$ to get $a_t$. Using the dynamics model 360, f, future prediction $$o_{t+1}^\dagger$$

is obtained to compute the MSE loss 395. Finally, the sum of losses is back-propagated 397 within the time window [0, T] in order to update 398 perturbation $\Delta o$.

Experiments

Experiments were performed using various aspects of the invention utilizing the CarRacing-v0 environment. In particular, within OpenAI Gym, the CarRacing-v0 environment was used to demonstrate the existence of adversarial objects that misguide an otherwise benign deep reinforcement learning agent. A model-free Actor-Critic algorithm was utilized to obtain the pre-trained policy $\pi$. The policy was trained with a batch size of 128 and $10^5$ episodes.

For the dynamics model 360, $\hat{f}$, of the environment 399, a variational autoencoder (VAE) was trained for $10^3$ epochs using an Adam optimizer. A variational autoencoder is a type of artificial neural network architecture within the families of probabilistic graphical models and variational Bayesian methods. Adam is an adaptive learning rate algorithm designed to improve training speeds in deep neural networks and reach convergence quickly.

The batch size was set to 32 and learning rate to 0.001 with decreasing learning rate based on plateau and early stopping. Training the MD-RNN, was performed for $10^3$ epochs using the same optimizer. Again, the batch size was set to 16, the number of Gaussian models to 5, and the learning rate was set to the same value as the training of VAE.

For the attack, the time span T was set to 25 and the adversarial bound to $\epsilon=0.9$. An ablation study done on these hyperparameters is described in greater detail below. The same optimizer was used as before, and the learning rate was set to 0.005 for I=$10^3$ iterations. The adversarial area was set to be 25 pixels wide and 30 pixels tall.

Baselines: There have been few results previously reported on targeted physical attacks on deep reinforcement learning agents. Although prior approaches overlap, those prior techniques and the experimental settings are different from that which is described here and for these reasons, they were not utilized as a baseline. Therefore, a baseline was utilized where $\Delta o$ is drawn uniformly in $[0,1]^{25 \times 30}$. By comparing agent state trajectories in the presence of random and optimized $\Delta o$, it is shown that the proposed attack is more effective than random perturbations.

Evaluation metrics: Two metrics are introduced to evaluate the effectiveness of an attack: Specifically, actions error and percentage change of value. The former is defined as the mean square error between the attacked and benign action values over T timesteps derived from rollouts with and without the adversarial object, respectively. The latter is the percentage change of value from the benign to the attacked rollout, where the value of a policy is the sum of rewards over [0, T].

Figure 5:
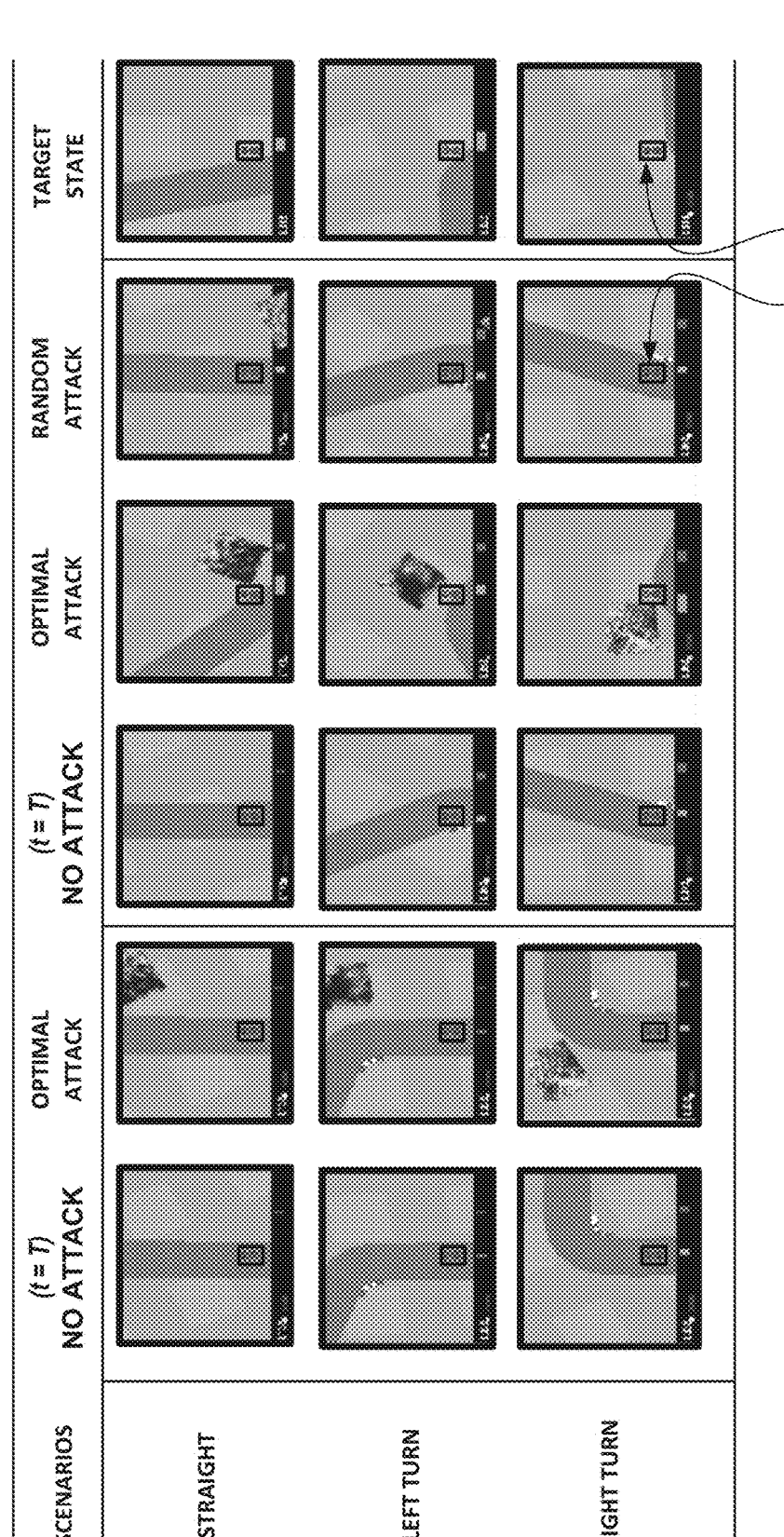
FIG. 5 sets forth Table 1 at element 500, showing both targeted and random attacks in three scenarios, in accordance with aspects of this disclosure.

FIG. 5 sets forth Table 1 at element 500, showing both targeted and random attacks in three scenarios, in accordance with aspects of this disclosure. The agent is shown within bounding boxes 525 of each scenario.

Experiments and Discussion

The above noted metrics were evaluated on three driving scenarios, and the evaluation compared the trajectories of the agent with and without the attack. Further, experiments were conducted to evaluate the robustness of the attack with respect to the object in different locations.

Finally, the effectiveness of the attack was compared with varying time span (T) and adversarial bound ($\epsilon$) based on the evaluation metrics.

Figure 6A:
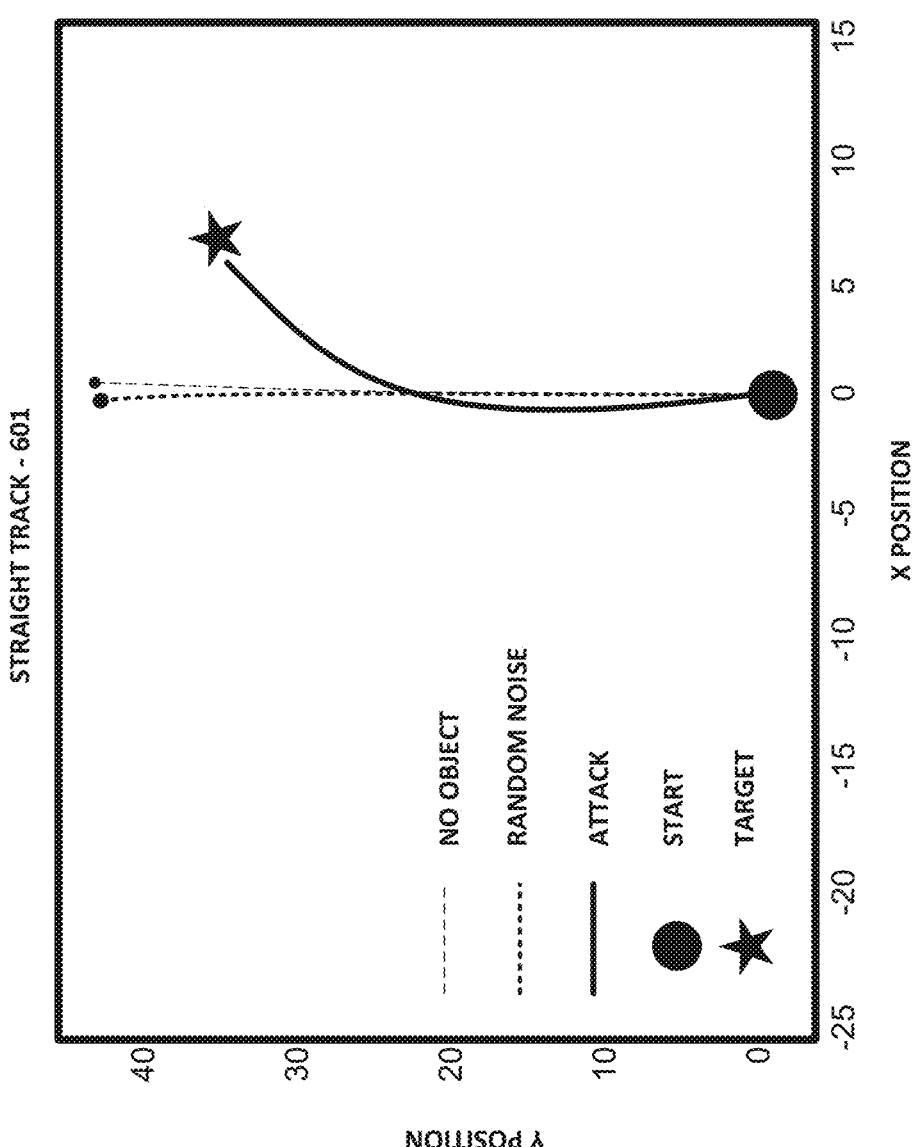
FIGS. 6A, 6B, and 6C illustrate various trajectories in the three scenarios with no attack, random attack, and optimized attacks, in accordance with aspects of this disclosure.
Figure 6B:
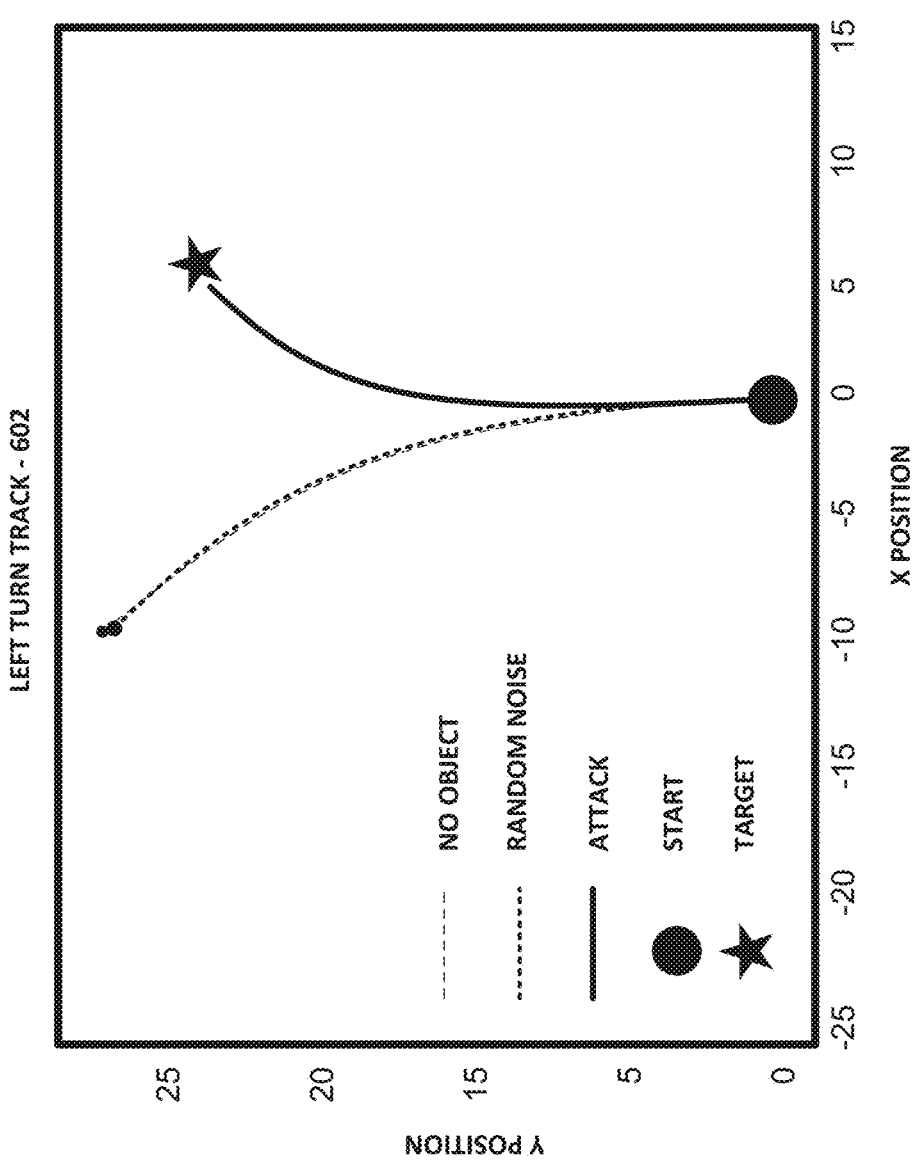
Figure 6C:
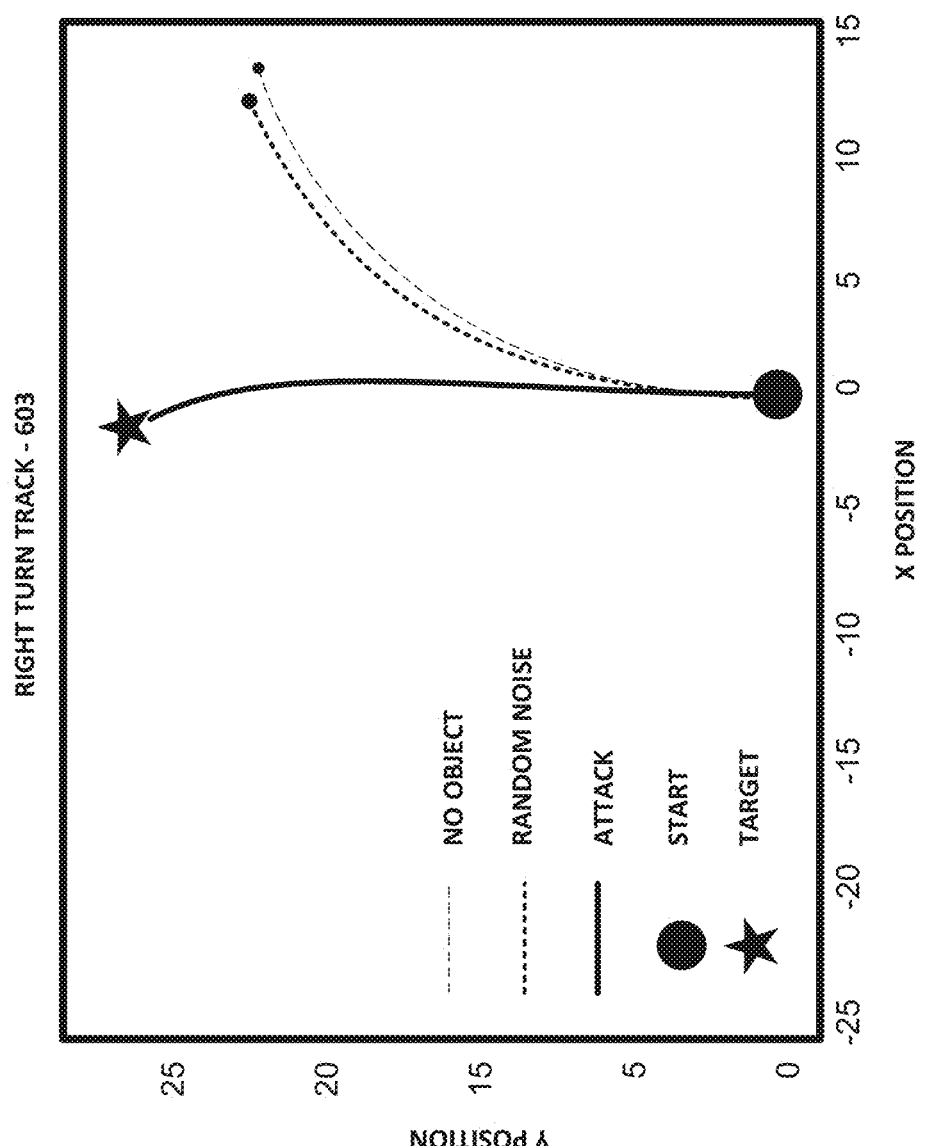

FIGS. 6A, 6B, and 6C illustrate various trajectories in the three scenarios with no attack, random attack, and optimized attacks, in accordance with aspects of this disclosure. FIG. 6A depicts straight track 601. FIG. 6B depicts left turn track 602. FIG. 6C depicts right turn track 603.

FIG. 7 sets forth Table 2 at element 700, providing a comparison with random noise baseline in terms of evaluation metrics, in accordance with aspects of this disclosure.

Attack scenarios: Three driving scenarios were considered where the agent with the benign policy will go straight, left, and right, respectively. In each of the scenarios, the object is placed at a fixed location in the environment so that it is observable by the agent throughout the attack. The target states were specified as the images shown in Table 1 as set forth at FIG. 5, element 500.

Comparison with the baseline: The trajectories of the agent were compared under the benign policy, the proposed attack, and the random attacks, with trajectory visualizations set forth at FIGS. 6A, 6B, and 6C and final states in Table 1 (FIG. 5, element 500).

For the random attack, ten (10) independent simulations were conducted for each scenario to derive the mean trajectories. The standard deviations in all three scenarios are negligible. The combined X axis Y axis in the figure represent the global coordinates.

Referring to FIG. 7, the results show that while the approach successfully misguides the agent in all scenarios 750, the agent is not affected as much by the random attacks. Specifically, in scenario 751, the agent goes straight, both with, and without, the presence of a random attack. In the presence of proposed attack 754, however, the agent deviates from the benign trajectory to reach the target state. The same happens for scenarios 752 and 753 when compared with proposed scenarios 755 and 756, respectively. It is worth noting that by comparing Table 1 (FIG. 5, element 500) and FIGS. 6A, 6B, and 6C, it is observed that the agent reaches the target location but does not perfectly match the target orientation. For instance, in the straight track scenario, it is observed that the optimal attack after t=T time steps forces the car to turn right, partially going off the road, but in the target state, the car is completely off the road on the right. Further exploration of the attack objective may potentially improve the matching of the orientation. Lastly, Table 2 (FIG. 7, element 700), quantifies the comparison through the evaluation metrics. The proposed attack outperforms the random ones on both metrics.

Figure 8:
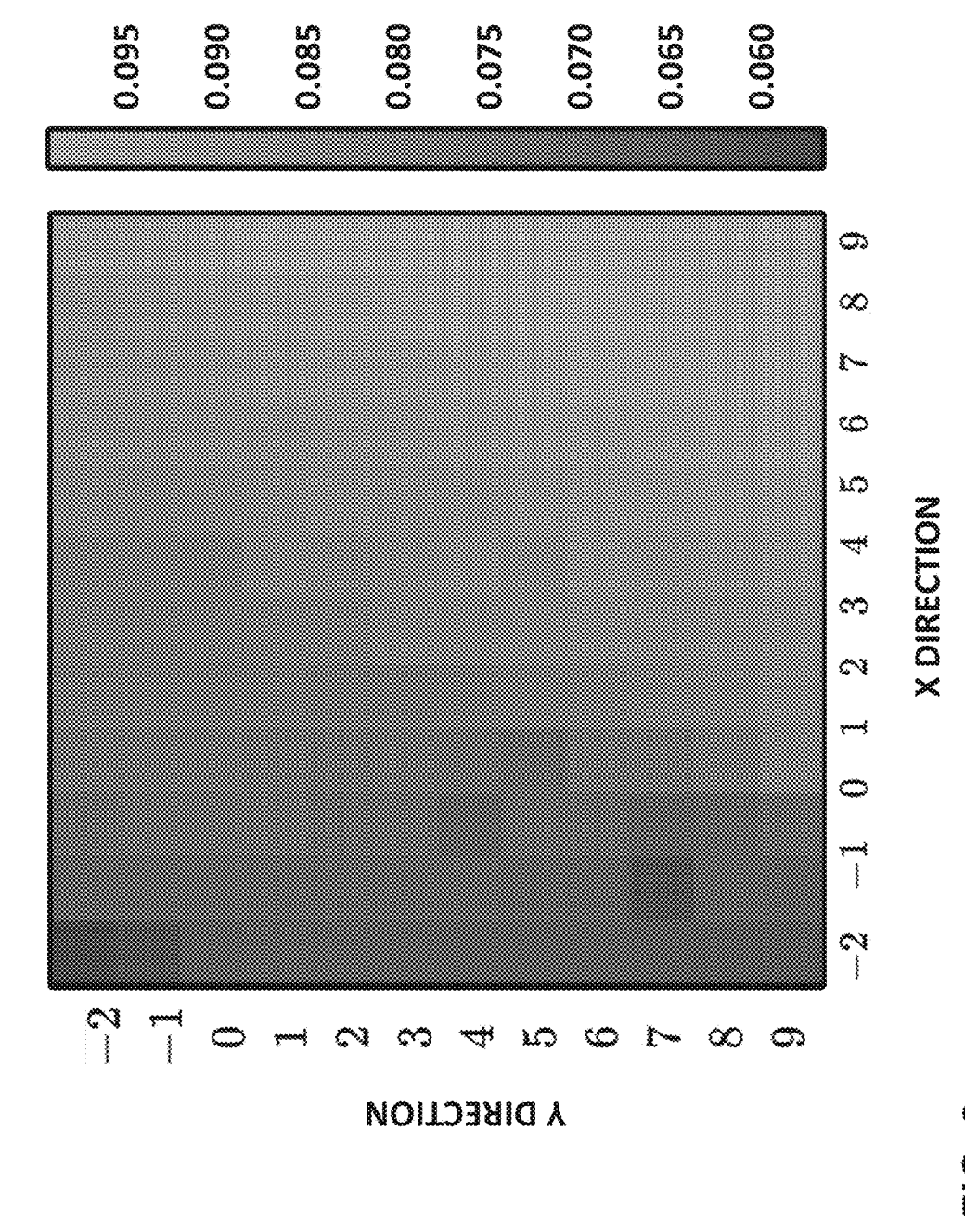
FIG. 8 depicts an attack robustness heat map 800 on position of a physical object in scenario I, in accordance with aspects of this disclosure.

FIG. 8 depicts an attack robustness heat map 800 on position of a physical object in scenario I, in accordance with aspects of this disclosure.

Robustness to translation: Further evaluated was the robustness of the attack with respect to different global coordinates of the attack object ($\Phi$) placed in the environment. Specifically, the position of the adversarial object was changed iteratively in x and y directions during test time with the same learned adversarial pattern. The experiment was performed on the straight track scenario, with fixed dynamical models.

As depicted at FIG. 8, the (x, y) coordinates represent position of the attack object relative to the actual object position. (0,0) in the original attack (i.e., the attack used in the experiments for Table 1, and heat map 800 of FIG. 8 represents the attack loss of Equation 4 when the object is moved accordingly.

Therefore, the dark region in the upper left of heat map 800 represents more successful attacks since the attack loss is lower, whereas the lighter region in the lower right represents relatively unsuccessful attacks as attack loss is higher. Note that the range of the figure is bounded by the constraints that the object cannot be on the track and cannot be out of the scene. From this test, if the object is moved towards the track (−X direction in FIG. 8), the attack will still be effective or even better. On the other hand, if the object is moved away from the track and partially out of the scene, the attack becomes less effective, which is reasonable since the agent will have only partial observation of the attack.

FIG. 9 sets forth Table 3 at element 900, depicting adversarial bounds 905 versus attack length 910, in accordance with aspects of this disclosure.

Adversarial bounds and Attack length: FIG. 9 details the results of an ablation study performed on the attack strength ($\epsilon$) and attack time span (T), by enumerating $\epsilon \in \{0.1, 0.3, 0.5, 0.9\}$ and $T \in \{15, 25, 30\}$. The results in terms of the optimal loss of Equation 4 and the actions error are summarized by Table 3. The experiments were performed on the straight track scenario, with fixed dynamical models. From the results, it is evident that larger $\epsilon$ improves the effectiveness of the attacks. Additionally, as the time window is enlarged, the actions error decreases in nearly all cases. Based on the experiments, it is believed that if T is smaller, then the attack has a smaller action space to plan on, causing it to alter the actions more aggressively than a bigger T. However, the attack loss increases from T=25 to T=30. Examining the results suggests this is primarily because the attack object moves out of the scene between T=25 and T=30. As a result of the limited observation of the attack object by the agent, the optimizer struggles to find a way to keep the agent close to the target state, thus the increased loss. This implies that the time window is coupled with the choice of the target state, and its careful selection is important for succeeding in the attack.

Therefore, methodologies are described herein that, though autonomous driving agents which are increasingly using deep reinforcement learning techniques, it is nevertheless possible that such agents can be fooled by simply placing an adversarial object in the environment. While previous studies in this domain focused on untargeted attacks without long-term effects, the improved methodologies described herein and the described attack techniques demonstrate the existence of static adversarial objects that can continuously misguide a deep reinforcement learning agent towards a target state within a time window. Using a standard simulator and a pre-trained policy. Algorithm 1 discussed above successfully searches for such attacks and has shown their existence empirically. For effective search of the attacks, differentiable dynamical models of the environment were utilized, which can be learned through experience collected by the attacker.

The disclosed approach notably has the full policy known to the attacker (white-box) Additionally, the attack highly depends on the size, position, and pattern of the object. More improvements on these areas may be further developed and evaluated to better understand the practicality of the threat model. For instance, an evaluation of the existence of robust physical attacks in more complex environments, e.g., with the presence of other agents and with visual or 3D observations would be valuable. By demonstrating the existence of a new type of attack more practical than digital perturbations, the disclosed methodology provides guidance toward more expansive research towards robust and safe AI methods for autonomous driving.

Figure 10:
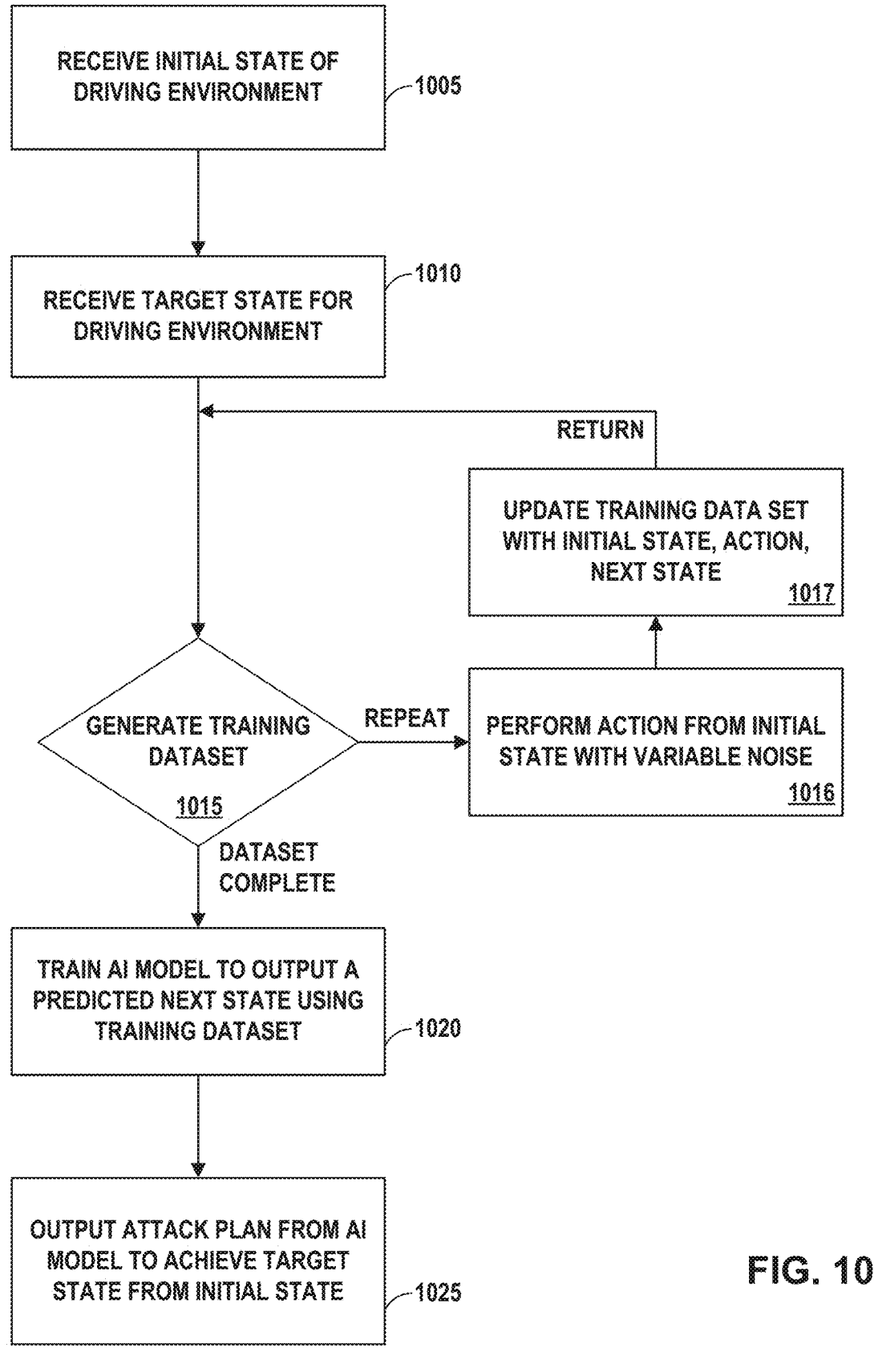
FIG. 10 is a flow chart illustrating an example mode of operation for a computing device to implement targeted attacks on deep reinforcement learning-based autonomous driving with learned visual patterns, in accordance with techniques of this disclosure.

FIG. 10 is a flow chart illustrating an example mode of operation for a computing device 100 to implement targeted attacks on deep reinforcement learning-based autonomous driving with learned visual patterns, in accordance with techniques of this disclosure. The mode of operation is described with respect to computing device 100 and FIGS. 2, 3A-3B, 4, 5, 6A-6C, 7, 8, and 9.

In some examples, one or more processors 102 and memory 104 (collectively processing circuitry) of computing device 100 may receive an initial state of a driving environment (1005). For instance, processing circuitry may receive a first input specifying an initial state for a driving environment having at least a roadway, a vehicle, and at least one obstacle positioned within the driving environment.

In some examples, processing circuitry may receive a target state for the driving environment (1010). For instance, processing circuitry may receive, from a user device, user configurable input specifying a target state for the driving environment. Such a user device may take on the role of an attacker or adversary and provide a target state for the driving environment or a target for the vehicle to reach within the drive environment or an obstacle as the target for the vehicle to collide with within the driving environment.

In some examples, processing circuitry generates a training dataset (1015). For instance, processing circuitry may generate a representative dataset for use as a training dataset for training an AI model. For instance, responsive to receiving the user configurable input specifying the target state for the driving environment, processing circuitry may generate a representative dataset of the driving environment by performing multiple rollouts of the vehicle through the driving environment.

Generation of the training dataset (1015) may repeat multiple times until generation of the training dataset is complete. For instance, for each iteration of generating the training dataset, processing circuitry may perform an action from an initial state with variable noise (1016) and update the training data set with an initial state, an action, and a next state for that iteration (1017). According to such an example, performing each of the multiple rollouts of the vehicle through the driving environment may include performing an action for the vehicle from the initial state using a pre-trained policy of an autonomous driving agent with variable strength noise added to the action to determine a next state resulting from the action on the initial state and updating the representative dataset with a rollout result tuple captured for each of the multiple rollouts performed specifying: (i) the initial state, (ii) the action including the variable strength noise added to the action, and (iii) the next state resulting from the action on the initial state. Processing circuitry repeats performing an action (1016) and updating the training dataset (1017) until the dataset is complete, after which flow returns and advances to the next operation.

In some examples, processing circuitry trains an AI model to output a predicted next state using the training dataset (1020). For instance, processing circuitry may train an artificial intelligence model to output a next predicted state of the vehicle within the driving environment for a new action by providing as training input to the artificial intelligence model, the representative dataset including the rollout result tuple captured for each of the multiple rollouts performed.

In some examples, processing circuitry outputs an attack plan for an AI model to achieve a target state from an initial state (1025). For instance, processing circuitry may output, from the artificial intelligence model, an attack plan against the autonomous driving agent to achieve the target state from the initial state.

In some examples, processing circuitry may predict the attack plan or generate as output, a prediction which specifies the attack plan. For instance, processing circuitry may iteratively: (i) obtain an adversarial image from the initial state; (ii) clip the adversarial image to a predetermined threshold to yield a valid image: (iii) compute a loss corresponding to a future state; (iv) compute a sum of losses within a predetermined time window; and (v) back-propagate the sum of the losses within a predetermined time window to update perturbations used by the artificial intelligence model for predicting the attack plan.

In accordance with at least one example, processing circuitry back-propagates the sum of the losses within the predetermined time window to update both a static perturbation and a structured perturbation to the driving environment.

According to some examples, processing circuitry trains the artificial intelligence model to learn dynamics of the driving environment by learning a differentiable dynamical model of the driving environment enabling a gradient-based attack.

According to at least one example, processing circuitry trains the artificial intelligence model to learn dynamics of the driving environment by learning a differentiable dynamical model of the driving environment enabling a gradient-based attack for the attack plan.

According to another example, processing circuitry trains the artificial intelligence model to learn environment dynamics by constructing a dynamical model using a variational autoencoder (VAE) and a mixture-density recurrent neural network (MD-RNN) utilizing the representative dataset as input including at least (i) the initial state and (ii) the action including the variable strength noise added to the action for each of the multiple rollouts performed. In such an example, processing circuitry may generate a predicted next state for the driving environment using the VAE and MD-RNN based on the training. In some examples, processing circuitry trains the VAE using a combination of mean square error and Kullback-Leibler divergence as the loss for training the VAE. In other examples, processing circuitry trains the MD-RNN using a Gaussian mixture loss. In certain examples, processing circuitry trains an AI model using both Kullback-Leibler divergence as the loss and a Gaussian mixture loss.

According to another example, processing circuitry provides the attack plan as input into a self-driving model having generated the autonomous driving agent for reinforcement learning by the self-driving model to update the pre-trained policy of the autonomous driving agent.

In yet another example, processing circuitry is configured to explore the driving environment utilizing the multiple rollouts of the vehicle through the driving environment and utilizing each respective action with variable strength noise added for the multiple rollouts performed.

In one example, processing circuitry learns dynamics of the vehicle approaching the target state within the driving environment by performing the multiple rollouts of the vehicle through the driving environment and utilizing each respective action with variable strength noise added for the multiple rollouts performed.

According to another example, the user device operates as an adversary to the autonomous driving agent. In such an example, the processing circuitry is configured for receiving, from the adversary, the target state for the driving environment having the vehicle deviate from the roadway or collide with the obstacle, or both. In such an example, processing circuitry may receive, from the adversary, the target state for the driving environment without specifying any attack instructions to achieve the target state for the driving environment.

According to a particular example, there is a computer-readable storage medium having instructions that, when executed, configure processing circuitry to: receive a first input specifying an initial state for a driving environment having at least a roadway, a vehicle, and at least one obstacle positioned within the driving environment: receive, from a user device, user configurable input specifying a target state for the driving environment; responsive to receipt of the user configurable input specifying the target state for the driving environment, generate a representative dataset of the driving environment by performance of multiple rollouts of the vehicle through the driving environment, in which performance of each of the multiple rollouts of the vehicle through the driving environment includes: performance of an action for the vehicle from the initial state using a pre-trained policy of an autonomous driving agent with variable strength noise added to the action to determine a next state resulting from the action on the initial state; update to the representative dataset with a rollout result tuple captured for each of the multiple rollouts performed that specifies: (i) the initial state, (ii) the action including the variable strength noise added to the action, and (iii) the next state which results from the action on the initial state; and train an artificial intelligence model to output a next predicted state of the vehicle within the driving environment for a new action by providing as training input to the artificial intelligence model, the representative dataset including the rollout result tuple captured for each of the multiple rollouts performed; and output, from the artificial intelligence model, an attack plan against the autonomous driving agent to achieve the target state from the initial state.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently. e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM. ROM. EEPROM. CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
receiving a first input specifying an initial state for a driving environment having at least a roadway, a vehicle, and at least one obstacle positioned within the driving environment;
receiving, from a user device, user configurable input specifying a target state for the driving environment;
responsive to receiving the user configurable input specifying the target state for the driving environment, generating a representative dataset of the driving environment by performing multiple rollouts of the vehicle through the driving environment, wherein performing each of the multiple rollouts of the vehicle through the driving environment includes:
performing an action for the vehicle from the initial state using a pre-trained policy of an autonomous driving agent with variable strength noise added to the action to determine a next state resulting from the action on the initial state;
updating the representative dataset with a rollout result tuple captured for each of the multiple rollouts performed specifying: (i) the initial state, (ii) the action including the variable strength noise added to the action, and (iii) the next state resulting from the action on the initial state; and
training an artificial intelligence model to learn environment dynamics and to generate a next predicted state of the vehicle within the driving environment for a new action by constructing a dynamical model using a variational autoencoder and a mixture-density recurrent neural network, and training the dynamical model using the representative dataset as input including at least (i) the initial state and (ii) the action including the variable strength noise added to the action for each of the multiple rollouts performed;
generating the next predicted state for the driving environment using the variational autoencoder and the mixture-density recurrent neural network based on the training; and
outputting from the artificial intelligence model, an attack plan against the autonomous driving agent to achieve the target state from the initial state.

2. The method of claim 1, further comprising:
predicting the attack plan by iteratively:
(i) obtaining an adversarial image from the initial state;
(ii) clipping the adversarial image to a predetermined threshold to yield a valid image;
(iii) computing a loss corresponding to a future state;
(iv) computing a sum of losses within a predetermined time window; and
(v) back-propagating the sum of the losses within a predetermined time window to update perturbations used by the artificial intelligence model for predicting the attack plan.

3. The method of claim 2, further comprising:
back-propagating the sum of the losses within the predetermined time window to update both a static perturbation and a structured perturbation to the driving environment.

4. The method of claim 1, further comprising:

training the artificial intelligence model to learn dynamics of the driving environment by learning a differentiable dynamical model of the driving environment enabling a gradient-based attack.

5. The method of claim 1, further comprising:

training the artificial intelligence model to learn dynamics of the driving environment by learning a differentiable dynamical model of the driving environment for generating the attack plan.

6. The method of claim 1, further comprising:

training the VAE using a combination of mean square error and Kullback-Leibler divergence as a loss function.

7. The method of claim 1, further comprising:

training the MD-RNN using a Gaussian mixture loss.

8. The method of claim 1, further comprising:

providing the attack plan as input into a self-driving model having generated the autonomous driving agent for reinforcement learning by the self-driving model to update the pre-trained policy of the autonomous driving agent.

9. The method of claim 1, further comprising:

exploring the driving environment utilizing the multiple rollouts of the vehicle through the driving environment and utilizing each respective action with variable strength noise added for the multiple rollouts performed.

10. The method of claim 1, further comprising:

learning dynamics of the vehicle approaching the target state within the driving environment by performing the multiple rollouts of the vehicle through the driving environment and utilizing each respective action with variable strength noise added for the multiple rollouts performed.

11. The method of claim 1:

wherein the user device operates as an adversary to the autonomous driving agent; and wherein the method further comprises receiving, from the adversary, the target state for the driving environment having the vehicle deviate from the roadway or collide with the obstacle, or both.

12. The method of claim 11, further comprising:

receiving, from the adversary, the target state for the driving environment without specifying any attack instructions to achieve the target state for the driving environment.

13. A system comprising:

processing circuitry;

non-transitory computer readable media; and instructions that, when executed by the processing circuitry, configure the processing circuitry to:

receive a first input specifying an initial state for a driving environment having at least a roadway, a vehicle, and at least one obstacle positioned within the driving environment;

receive, from a user device, user configurable input specifying a target state for the driving environment;

responsive to receipt of the user configurable input specifying the target state for the driving environment, generate a representative dataset of the driving environment by performance of multiple rollouts of the vehicle through the driving environment, wherein performance of each of the multiple rollouts of the vehicle through the driving environment includes:

performance of an action for the vehicle from the initial state using a pre-trained policy of an autonomous driving agent with variable strength noise added to the action to determine a next state resulting from the action on the initial state;

update to the representative dataset with a rollout result tuple captured for each of the multiple rollouts performed that specifies: (i) the initial state, (ii) the action including the variable strength noise added to the action, and (iii) the next state which results from the action on the initial state; and train an artificial intelligence model to learn environment dynamics and to generate a next predicted state of the vehicle within the driving environment for a new action by constructing a dynamical model using a variational autoencoder and a mixture-density recurrent neural network, and training the dynamical model using the representative dataset as input including at least (i) the initial state and (ii) the action including the variable strength noise added to the action for each of the multiple rollouts performed;

generate the next predicted state for the driving environment using the variational autoencoder and the mixture-density recurrent neural network based on the training; and output, from the artificial intelligence model, an attack plan against the autonomous driving agent to achieve the target state from the initial state.

14. The system of claim 13, wherein the instructions configure the processing circuitry to:

predict the attack plan by iteratively:

(i) obtaining an adversarial image from the initial state;

(ii) clipping the adversarial image to a predetermined threshold to yield a valid image;

(iii) computing a loss corresponding to a future state;

(iv) computing a sum of losses within a predetermined time window; and (v) back-propagating the sum of the losses within a predetermined time window to update perturbations used by the artificial intelligence model for predicting the attack plan.

15. The system of claim 14, wherein the instructions configure the processing circuitry to:

back-propagate the sum of the losses within the predetermined time window to update both a static perturbation and a structured perturbation to the driving environment.

16. The system of claim 13, wherein the instructions configure the processing circuitry to:

training the artificial intelligence model to learn dynamics of the driving environment by learning a differentiable dynamical model of the driving environment enabling a gradient-based attack.

17. Non-transitory computer-readable storage media comprising instructions that, when executed, configure processing circuitry to:

receive a first input specifying an initial state for a driving environment having at least a roadway, a vehicle, and at least one obstacle positioned within the driving environment;

receive, from a user device, user configurable input specifying a target state for the driving environment;

responsive to receipt of the user configurable input specifying the target state for the driving environment, generate a representative dataset of the driving environment by performance of multiple rollouts of the vehicle through the driving environment, wherein performance of each of the multiple rollouts of the vehicle through the driving environment includes:

performance of an action for the vehicle from the initial state using a pre-trained policy of an autonomous driving agent with variable strength noise added to the action to determine a next state resulting from the action on the initial state;

update to the representative dataset with a rollout result tuple captured for each of the multiple rollouts performed that specifies: (i) the initial state, (ii) the action including the variable strength noise added to the action, and (iii) the next state which results from the action on the initial state; and train an artificial intelligence model to learn environment dynamics and to generate a next predicted state of the vehicle within the driving environment for a new action by constructing a dynamical model using a variational autoencoder and a mixture-density recurrent neural network, and training the dynamical model using the representative dataset as input including at least (i) the initial state and (ii) the action including the variable strength noise added to the action for each of the multiple rollouts performed;

generate the next predicted state for the driving environment using the variational autoencoder and the mixture-density recurrent neural network based on the training; and output, from the artificial intelligence model, an attack plan against the autonomous driving agent to achieve the target state from the initial state.

18. The non-transitory computer-readable storage media of claim 17, wherein the instructions configure the processing circuitry to:

predict the attack plan by iteratively:
  (i) obtaining an adversarial image from the initial state;
  (ii) clipping the adversarial image to a predetermined threshold to yield a valid image;
  (iii) computing a loss corresponding to a future state;
  (iv) computing a sum of losses within a predetermined time window; and
  (v) back-propagating the sum of the losses within a predetermined time window to update perturbations used by the artificial intelligence model for predicting the attack plan.

19. The non-transitory computer-readable storage media of claim 18, wherein the instructions configure the processing circuitry to:

back-propagate the sum of the losses within the predetermined time window to update both a static perturbation and a structured perturbation to the driving environment.

* * * * *